United States Patent [19]

Sugihara et al.

[11] Patent Number: 4,906,085
[45] Date of Patent: Mar. 6, 1990

[54] SIDEVIEW MIRROR ASSEMBLY WITH REGULATING FILTER USING SUNLIGHT FOR AUTOMOBILES

[75] Inventors: Susumo Sugihara; Michio Aoki; Yutaka Yoshida, all of Aichi, Japan

[73] Assignee: Kabushiki Kaisha Tokai Rika Denki Seisakusho, Japan

[21] Appl. No.: 281,835

[22] Filed: Dec. 8, 1988

Related U.S. Application Data

[62] Division of Ser. No. 67,137, Jun. 26, 1987.

[30] Foreign Application Priority Data

Jun. 30, 1986 [JP] Japan ............................. 61-100371
Jun. 30, 1986 [JP] Japan ............................. 61-100372
Jun. 30, 1986 [JP] Japan ............................. 61-100373

[51] Int. Cl.$^4$ .................... B60R 1/06; B60R 1/08; B60R 1/12; G02B 5/10
[52] U.S. Cl. .................................................... 350/601
[58] Field of Search .......... 350/601, 600, 278, 276 R, 350/276 SL

[56] References Cited

U.S. PATENT DOCUMENTS 3,266,016 8/1966 Maruyama et al. .................... 340/98

FOREIGN PATENT DOCUMENTS

185338 10/1953 Japan ................................. 350/278
1172382 11/1969 United Kingdom ................ 350/601

Primary Examiner—Jon W. Henry
Attorney, Agent, or Firm—Steele, Gould & Fried

[57] ABSTRACT

A sideview mirror for automobiles includes a half mirror, a regulating filter mounted in opposed relation to a backside of the half mirror and a light-emitting diode for applying light to the regulating filter. The half mirror has both light reflecting and transmitting characteristics. The regulating filter is so arranged that only part of the light from the light-emitting diode is allowed to pass through the regulating filter to be thereby directed toward a following vehicle and that the remainder of the light from the light-emitting diode is prevented from passing through the regulating filter. Since an image reflected on the half mirror is overlapped with the part of the light from the light-emitting diode, the contrast of the image is reduced.

4 Claims, 8 Drawing Sheets

SIDEVIEW MIRROR ASSEMBLY WITH REGULATING FILTER USING SUNLIGHT FOR AUTOMOBILES

BACKGROUND OF THE INVENTION

This is a divisional of co-pending application Ser. No. 067,137 filed on June 26, 1987.

1. Field of the Invention

This invention relates generally to sideview mirrors for automobile vehicles through which a driver views the rearward traffic conditions, and more particularly to an improved sideview mirror assembly which can prevent a driver of the following vehicle from viewing the inside of the compartment of the preceding vehicle therethrough.

2. Description of the Prior Art

An automobile vehicle is provided with sideview mirrors mounted on the front wing portion or on the front doors. The sideview mirror usually comprises a glass panel, on the backside of which metal such as chromium is coated. The glass panel is formed into a plane mirror or a convex mirror having a large value of curvature radius. The sideview mirror is, for example, securely fixed to a mirror holder mounted in a housing secured to the door of the automobile vehicle. The mirror holder is adjustable as to lateral and vertical angularity.

Since the above-described sideview mirror is mounted not so far way from the driver's seat and since the plane mirror or convex mirror is employed as a reflecting mirror, the driver of the following vehicle can easily view the driver's face and the inside of the compartment of the preceding vehicle through the sideview mirror of the preceding vehicle. Since the sideview mirrors have recently been mounted on the front doors in an increasing number of automobiles, the above-mentioned problem of the privacy of the driver or passengers has become conspicuous and the solution of the problem has been desired.

SUMMARY OF THE INVENTION

It is, therefore, an object of the present invention to provide an improved sideview mirror assembly for automobile vehicles wherein it is difficult for the driver of the following vehicle to view the inside of the preceding vehicle compartment therethrough, whereas the driver of the preceding vehicle can view the rearward traffic conditions therethrough.

According to a first aspect of this invention, the sideview mirror assembly for automobile vehicles comprises a half mirror, a regulating filter provided in an opposed relation to a backside of the half mirror and means for applying light to a backside of the regulating filter. The regulating filter is so designed that light impinging thereon from a predetermined direction is allowed to pass therethrough and that light impinging thereon from the other directions is prevented from passing therethrough. As well known in the art, the half mirror has both light reflecting and transmitting characteristics and therefore the driver can view the rearward traffic conditions through the half mirror. In the sideview mirror assembly of this invention, the regulating filter is arranged so that part of light from the light applying means is allowed to pass through the regulating filter, which part of the light is directed toward the following vehicle. Accordingly, both the image of the inside of the vehicle compartment reflected on the mirror and part of the light from the light applying means through the regulating filter and the half mirror reach eyes of the driver of the following vehicle. Consequently, since the image of the inside of the vehicle compartment is overlapped with the light from the light applying means, it is difficult for the driver of the following vehicle to view the inside of the preceding vehicle compartment through the sideview mirror of the preceding vehicle. Whereas, since the remainder of the light from the light applying means is prevented from reaching the driver through the mirror by the regulating filter, the driver can view the rearward traffic conditions through the sideview mirror without suffering from any dazzle.

According to a second aspect of this invention, the sideview mirror assembly includes a reflecting member such as a piece of white colored paper instead of the light applying means. The reflecting member is provided in an opposed relation to the regulating filter. The ambient light (sunbeam) reaches the reflecting member through the half mirror to be reflected by the reflecting member. Part of the light reflected by the reflecting member is directed toward the following vehicle through the regulating filter. As a result, it is difficult for the driver of the following vehicle to view the inside of the preceding vehicle compartment through the sideview mirror of the preceding vehicle.

According to a third aspect of this invention, the sideview mirror assembly includes a light transmitting panel formed of colored or colorless transparent material instead of the regulating filter. The light transmitting panel is provided between the backside of the half mirror and the light applying means so as to be opposed to the backside of the half mirror. The light transmitting panel has a number of inclined portions on the surface so that the light is reflected. Accordingly, most of the light emitted by the light applying means to impinge on the backside of the half mirror through the light transmitting panel is refracted on the inclined portions of the light transmitting panel. Most of the light through the light transmitting panel is thus deflected toward the following vehicle. Consequently, it is difficult for the driver of the following vehicle to view the inside of the preceding vehicle compartment through the sideview mirror of the preceding vehicle.

Other objects and a fuller understanding of the invention will be had by referring to the following description of the preferred embodiments and the appended claims, and various advantages not referred to herein will occur to one skilled in the art upon employment of the invention in practice.

DESCRIPTION OF THE PREFERRED EMBODIMENTS

Figures 1, 2:
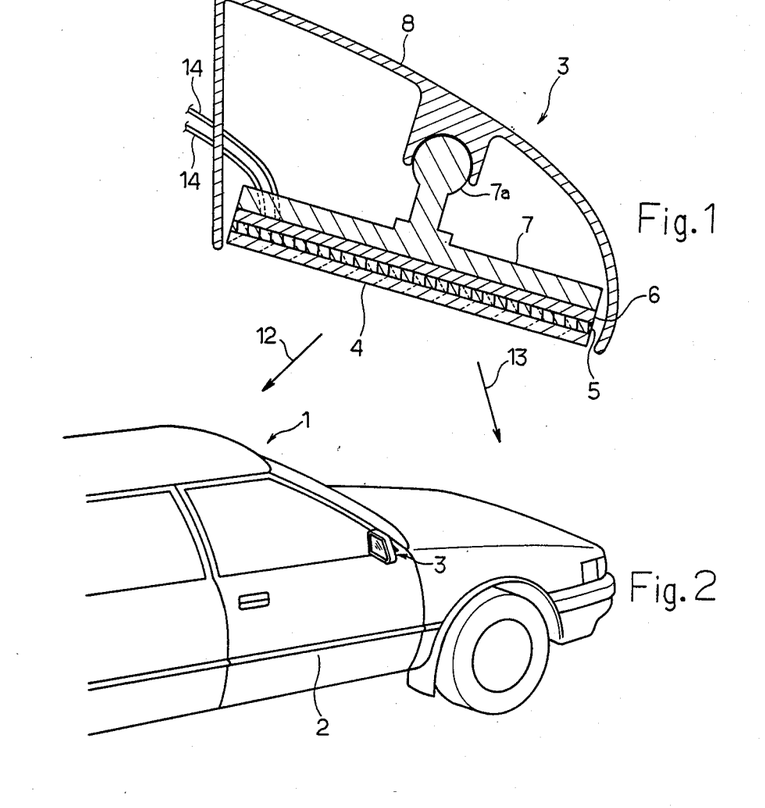
FIG. 1 is a transverse cross section of the sideview mirror assembly in accordance with a first embodiment of this invention.
FIG. 2 is a perspective view of an automobile vehicle on which the sideview mirror assembly of the first embodiment is mounted.
Figure 3:
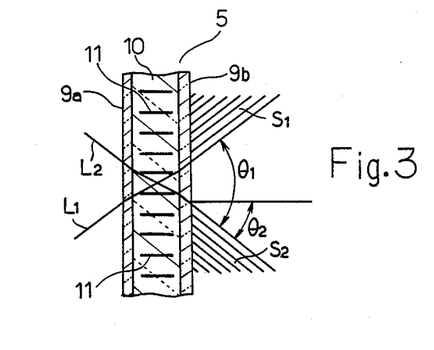
FIG. 3 is an enlarged longitudinal section of the regulating filter employed in the sideview mirror assembly of the first embodiment.

First Embodiment (See FIGS. 1–3)

The sideview mirror assembly of the present invention may be applied to both of the sideview mirrors mounted on the respective sides or the front doors of the automobile vehicle, or may be applied only to the sideview mirror of the driver's seat side.

In a first embodiment, the sideview mirror assembly of this invention is applied to the sideview mirror 3 mounted on the right-side front door 2 of an automobile 1, as shown in FIG. 2.

Referring to FIG. 1, the sideview mirror 3 comprises a flat half mirror 4, a regulating filter 5 provided in an opposed relation to a backside of the half mirror 4 and means 6 for applying light to the regulating filter 5. The light applying means 6 is provided in an opposed relation to a backside of the regulating filter 5 and includes an electroluminescent panel or a light-emitting diode as a light source. The half mirror 4, the regulating filter 5 and the light applying means 6 are put one upon another as described above and integrally fixed to a mirror holder 7 securely. The mirror holder 7 is mounted in a mirror housing 8 with a joint member 7a movable in the lateral and vertical directions provided therebetween. The mirror housing 8 is mounted on the door 2 of the vehicle 1.

The half mirror 4 comprises a transparent substrate formed of glass. A thin film of dielectrics such as titanium oxide or magnesium fluoride is formed on the surface of the transparent substrate. Part of the light impinging on the half mirror 4 is reflected on the surface of the dielectric film and part of the light passes through the dielectric film. The half mirror 4 thus has both light reflecting and transmitting characteristics.

Alternatively, the half mirror 4 may be composed of a transparent panel, on the surface of which a film of metal such as aluminum or chromium is formed.

As well known in the art, the regulating filter 5 allows the light from a predetermined direction to pass therethrough. FIG. 3 illustrates a conception of the regulating filter 5. Two transparent films 9a and 9b are formed on both sides of transparent panel 10 respectively. A large number of sunbeam-absorptive partition films 11 (black-coated films, for example) are disposed in a spaced apart relation to one another within the transparent panel 10 so that the transparent panel 10 is traversed by the films 11 in the direction of its thickness.

As the result of the above-described arrangement, since part of light impinging on the regulating filter 5 reaches the partition films 11 to be thereby absorbed, the light from the predetermined direction (for example, the light running parallel to the partition films 11, as shown in FIG. 3) is allowed to pass through the regulating filter 5. In FIG. 3, $L_1$ and $L_2$ denote optical axes of the maximum inclination at which the light is allowed to pass between the partition films 11, 11 through the regulating filter 5, respectively. $S_1$ and $S_2$ denote areas where the light is prevented from passing through the regulating filter 5. $\theta_1$ denotes the visible angle range and $\theta_2$ denotes half the visible angle range $\theta_1$. The visible direction and visible angle range can be selected by changing the angle of the partition films 11. In this embodiment, the regulating filter 5 is so arranged that part of light emitted from the light applying means 6 in the direction of the inside of the compartment of the vehicle as shown by arrow 12 in FIG. 1 is prevented from passing through the regulating filter 5 and that part of the light emitted from the light applying means 6 in the direction of a following vehicle (not shown) as shown by arrow 13 in FIG. 1 is allowed to pass through the regulating filter 5.

Leads 14 are provided for connecting between the light applying means 6 and the electrical power supply source (not shown).

The sideview mirror 3 is angularly adjusted by the driver so that the driver can view the rearward traffic conditions therethrough. In the adjusted condition of the sideview mirror 3, the light from the light applying means 6 is allowed to travel to the rearward of the vehicle through the regulating filter 5 and the half mirror 4 and therefore prevented from reaching the driver by the regulating filter 5. Accordingly, an image reflected on the half mirror 4 as seen from the driver's side is not affected by the light from the light applying means 6 and the driver can view the rearward traffic conditions through the half mirror 4. Whereas, when the driver of a following vehicle (not shown) looks through the half mirror 4 of the sideview mirror 3, an image reflected on the half mirror 4 is overlapped with the light from the light applying means 6. Consequently, the contrast of the image reflected on the half mirror 4 is reduced, whereby it is difficult for the driver of the following vehicle to view the driver of the preceding vehicle or the inside of the preceding vehicle compartment through the half mirror 4. Consequently, the sideview mirror 3 effectively prevents the driver of the following vehicle from viewing the face of the driver of the preceding vehicle or the inside of the preceding vehicle compartment therethrough.

Figure 4:
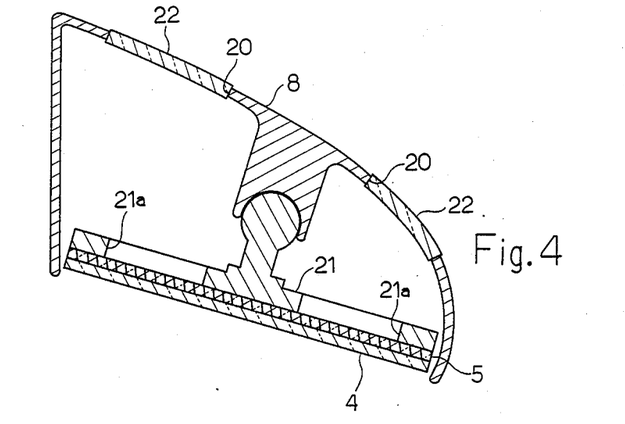
FIG. 4 is a transverse cross section of the sideview mirror assembly of a second embodiment.

Second Embodiment (See FIG. 4)

Referring now to FIG. 4, the light applying means 6 employed in the sideview mirror assembly of the first embodiment is eliminated in the second embodiment. Instead, a plurality of transparent panels 22 are embedded in an outer wall portion of the mirror housing 8 so that a plurality of small windows 20 are provided for introducing the sunbeam therethrough as the light applying means. Furthermore, a mirror holder 21 is provided with apertures 21a. The ambient light (sunbeam) passes through the lighting windows 20 and reaches the backside of the regulating filter 5 through the apertures 21a.

The same effect as in the first embodiment can be attained by the sideview mirror of the second embodiment. Particularly, since the light applying means requiring supply of electrical power is denecessitated, the construction of the sideview mirror assembly can be simplified and electrical power is not required.

Figure 5:
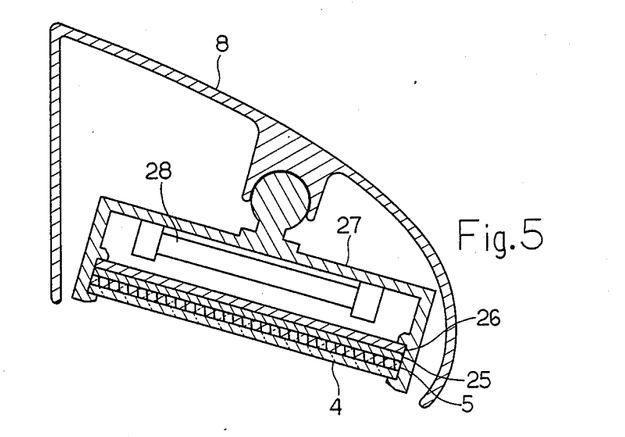
FIG. 5 is a transverse cross section of the sideview mirror assembly of a third embodiment.
Figure 6:
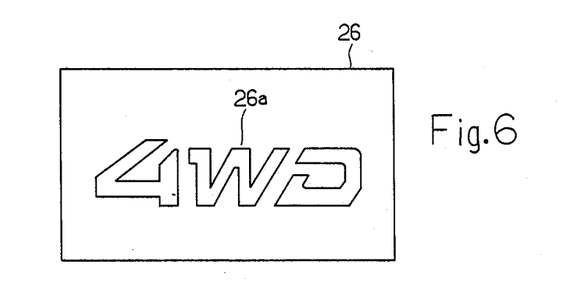
FIG. 6 is a plan view of a mark plate employed in the sideview mirror assembly of the third embodiment.
Figure 7:
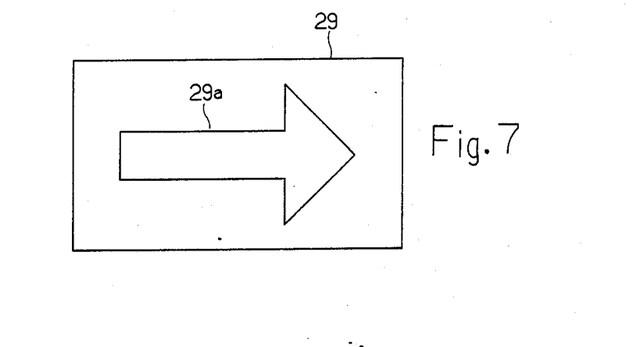
FIG. 7 is a plan view of the mark plate as a modification of the mark plate shown in FIG. 6.

Third Embodiment (See FIGS. 5, 6 and 7)

The sideview mirror assembly of a third embodiment will now be described with reference to FIG. 5 and 6. Referring first to FIG. 5, the reference numeral 25 indicates a light diffusing panel abutting on the backside of the regulating filter 5. A mark plate 26 having transparency is provided on the backside of the light diffusing panel 25. As shown in FIG. 6, a semi-transparent or non-transparent mark 26a is formed on the mark plate 26. The half mirror 4, the regulating filter 5, the light diffusing panel 25 and the mark plate 26 are integrally held by a mirror holder 27 which is mounted for lateral and vertical movement on the mirror housing 8 secured to the door of the automobile vehicle. A lamp 28 as the light applying means is provided within the mirror holder 27 so that the light therefrom reaches the backside of the regulating filter 5 through the mark plate 26 and the light diffusing panel 25.

The light from the lamp 28 is prevented from reaching the driver by the regulating filter 5 and the driver can view the rearward traffic conditions through the half mirror 4. The light from the lamp 28 reaches the backside of the half mirror 4 through the mark plate 26, the light diffusing panel 25 and the regulating filter 5. Since the light is overlapped with the image of the inside of the vehicle compartment on the surface of the half mirror 4 except the area of the mark 26a, it is difficult for the driver of the following vehicle to view the inside of the preceding vehicle through the sideview mirror 3. When the driver of the following vehicle looks into the half mirror 4, particularly, the image of the mark 26a on the mark plate 26 can be seen through the half mirror 4 by the driver of the following vehicle, thereby contributing to improvement of the design of the automobile vehicle.

FIG. 7 illustrates a modification of the mark plate 26. A non-transparent arrow mark 29a indicating the turn direction of the vehicle is provided on a mark plate 29. The mark plate 29 is provided with a turn indicating function the same as the turn indicating lamps (not shown) of the vehicle when the lamp 28 is turned on and off intermittently in synchronization with the turn indicating lamps of the vehicle.

In a further modification, mark 26a or 29a may be provided on the light diffusing panel 25 and therefore the mark plate 26 or 29 may be eliminated.

Figure 8:
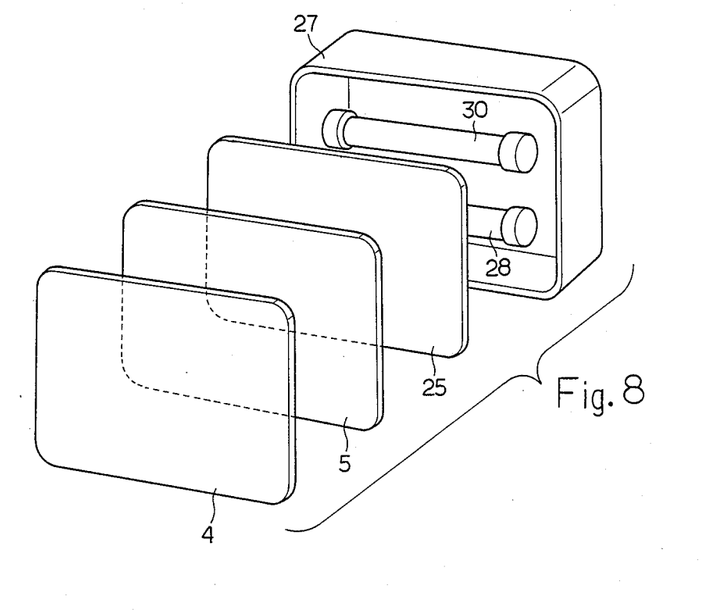
FIG. 8 is an exploded perspective view of the sideview mirror assembly of a fourth embodiment.

Fourth Embodiment (See FIG. 8)

In this sideview mirror assembly of a fourth embodiment, the mark plate 26 or 29 employed in the assembly of the third embodiment is eliminated. A lamp 30 is provided in the vicinity of the lamp 28. The lamp 30 is adapted to emit light having a color different from that of the light emitted from the lamp 28, for example, orange. The lamp 30 is turned on and off intermittently in synchronization with the turn indicating lamps of the vehicle. The lamp 28 is turned off while the lamp 30 is being turned on and off intermittently, whereby the half mirror 4 has the same turn indicating function as the turn indicating lamps of the vehicle. In this embodiment, it is also difficult for the driver of the following vehicle to view the inside of the preceding vehicle compartment through the sideview mirror 3.

The lamps 28 and 30 may be eliminated and instead a flat light-emitting member such as an electroluminescent panel provided with an arrow mark (non-luminescent area) as the mark 29a in FIG. 7 may be employed.

Figure 9:
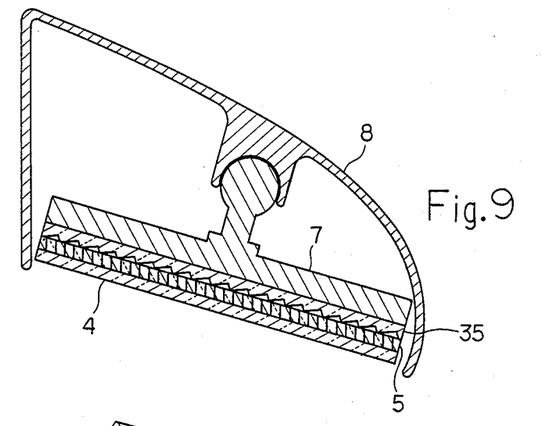
FIG. 9 is a transverse cross section of the sideview mirror assembly of a fifth embodiment.
Figure 10:
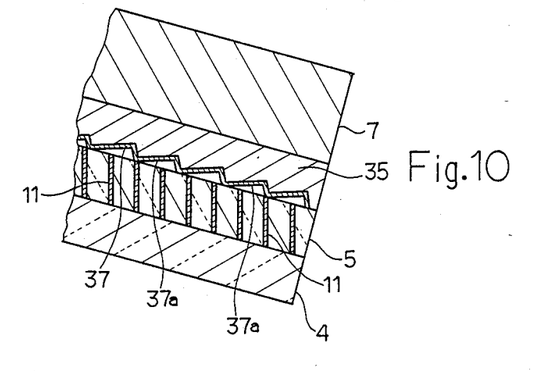
FIG. 10 is a partially enlarged view of the sideview mirror assembly in FIG. 9.

Fifth Embodiment (See FIG. 9 and 10)

In a fifth embodiment, the light applying means 6 employed in the assembly of the first embodiment is replaced by a plate-shaped reflecting member 35, as shown in FIG. 9. A concavo-convex light-reflecting surface 37 is formed on a surface of the reflecting member 35, which surface is opposed to the regulating filter 5, as is shown in FIG. 10. Inclination of each inclined portion 37a is determined so that the light reflected on each inclined portion 37a is directed in the same direction as that of the light passing through the regulating filter, which direction is defined by the partition films of the regulating filter 5. Consequently, most of the light traveling from the rearward of the vehicle to reach the light reflecting surface 37 of the reflecting member 35 is reflected in the direction that the regulating filter 5 allows the light to pass therethrough. Accordingly, when the driver views the image on the half mirror 4 on driving, the image reflected on the half mirror 4 is not affected by the light reflected by the reflecting member 35, so that the driver can view the rearward traffic conditions through the half mirror 4. Whereas, when the driver of the following vehicle looks into the half mirror 4, the image of the inside of the preceding vehicle compartment is overlapped with the light reflected on the reflecting member 35, thereby reducing the contrast of the image reflected on the half mirror 4. Consequently, it is difficult for the driver of the following vehicle to view the inside of the preceding vehicle compartment through the half mirror 4.

Figure 11:
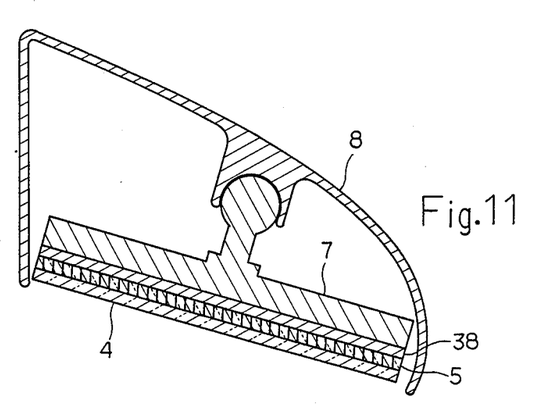
FIG. 11 is a transverse cross section of the sideview mirror assembly of a sixth embodiment.

Sixth Embodiment (See FIG. 11)

In the sideview mirror assembly of a sixth embodiment, a piece of white-colored paper 38 is employed as the light reflecting member. Other construction is the same as that of the assembly of the fifth embodiment. The same effect as in the fifth embodiment can be attained in the sixth embodiment.

Figure 12:
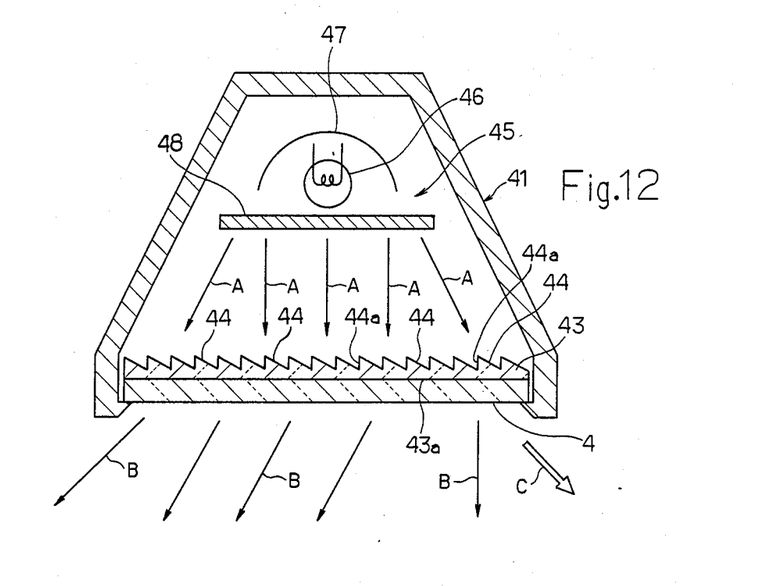
FIG. 12 is a transverse cross section of the sideview mirror assembly of a seventh embodiment.
Figure 13:
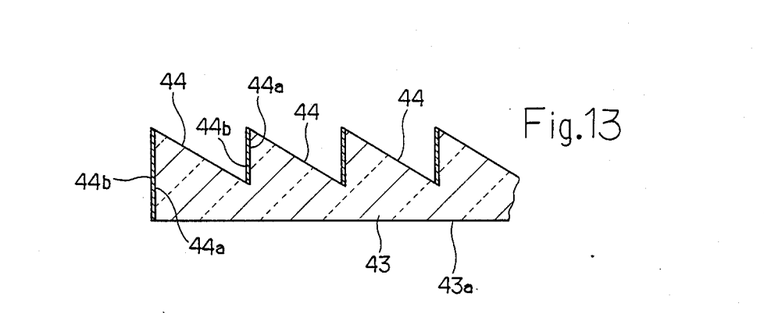
FIG. 13 is a partially enlarged view of the sideview mirror assembly in FIG. 12.

Seventh Embodiment (See FIG. 12 and 13)

A mirror housing 41 is mounted on the left-side front door of a vehicle having a driver's seat at the left-hand side of the compartment. The mirror housing 41 is configured into an enclosure having an open backside end (lower side in FIG. 2) and a black coating is applied to the inside of the mirror housing 41. The half mirror 4 is mounted at the open backside end of the mirror housing 41. A light transmitting panel 43 formed of a transparent material is abutting on the backside of the half mirror 4 at one surface thereof. A large number of inclined portions 44 are formed on the other surface of the light transmitting panel 43. Each inclined portion 44 has a rise surface 44a substantially perpendicular to the front surface thereof abutting on the half mirror 4. As shown in FIG. 13, black coating is applied to each rise surface 44a so that the light reflected diffusely is absorbed. A light applying means is provided behind the light transmitting panel 43 within the mirror housing 41. The light applying means 45 comprises a lamp 46, a reflecting mirror 47 provided at the backside of the lamp 46 and a light diffusing panel 48 provided at the front side of the lamp 46. The inclined portions 44 of the light transmitting panel 43 are adapted to refract light A from the light applying means 45 so that the light A is directed toward the rear with respect to the direction that the vehicle is being driven, particularly, to the following vehicle, as shown by arrow B in FIG. 12. As a result, the light transmitting panel 43 also serves as the regulating filter employed in the assembly of the first embodiment.

The light A from the light applying means 45 is prevented from being reflected diffusely by each rise surface 44a to which black coating is applied. The light A is refracted on the inclined portions 44 to be thereby introduced through the half mirror 4 to the rear, that is, in the direction of arrow B. Accordingly, the light A from the light applying means 45 is prevented by the light transmitting panel 43 from being directed to the driver positioned in the direction of arrow C. As a result, the driver can view the rearward traffic conditions through the half mirror 4. Whereas, when the driver of the following vehicle looks into the half mirror 4, the image of the inside of the preceding vehicle compartment on the half mirror 4 is overlapped with the light from the light applying means 45 and the contrast of the image on the half mirror 4 is reduced.

Figure 14:
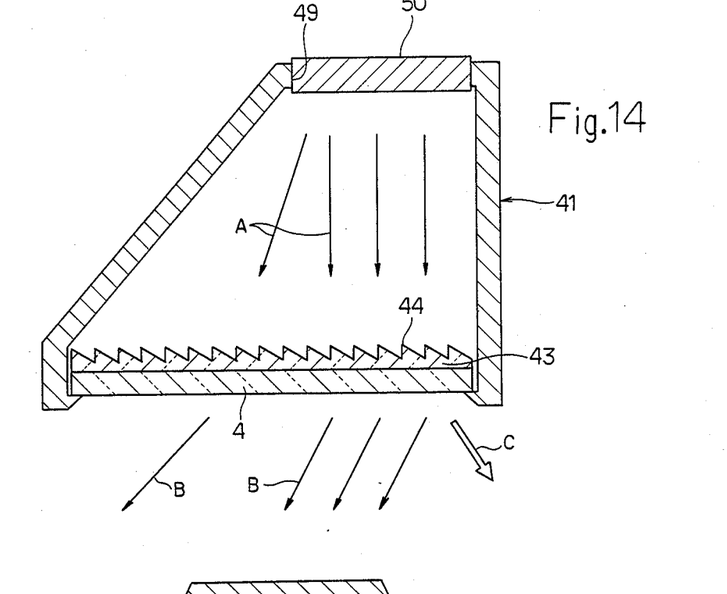
FIG. 14 is a transverse cross section of the sideview mirror assembly of an eighth embodiment.

Eighth Embodiment (See FIG. 14)

FIG. 14 illustrates the sideview mirror assembly of an eighth embodiment. In the eighth embodiment, the light applying means 45 employed in the seventh embodiment is eliminated. Instead, a light introducing window 49 as the light applying means is formed in the front side of the mirror housing 41 (upper side in FIG. 14). A light diffusing panel 50 is attached in the light introducing window 49. The outer light introduced through the light introducing window 49 and the light diffusing panel 50 impinges on the light transmitting panel 43.

Figure 15:
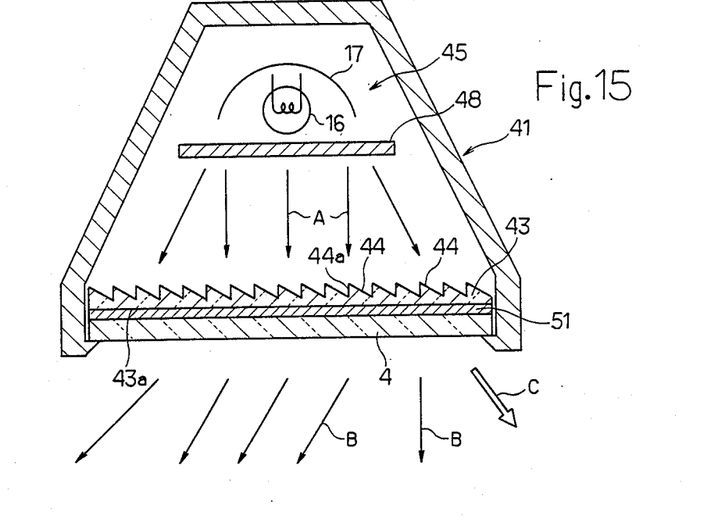
FIG. 15 is a transverse cross section of the sideview mirror assembly of a ninth embodiment.
Figure 16:
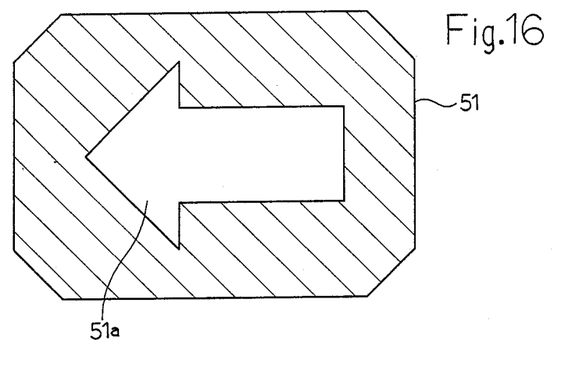
FIG. 16 is a plan view of a mark plate employed in the sideview mirror assembly in FIG. 15.

Ninth Embodiment (See FIG. 15 and 16)

The sideview mirror assembly of the ninth embodiment differs from that of the seventh embodiment in that a figure displaying panel 51 is provided between the half mirror 4 and the light transmitting panel 43. The figure displaying panel 51 is so designed that only the area of a figure 51a thereof allows the light to pass therethrough.

The sideview mirror assembly of the ninth embodiment can be employed as an information means against the passers-by and drivers of motorcycles positioned on the left side of the vehicle, since the figure area 51a is brighter than the other area of the figure displaying panel 5, this can easily be caught in the eyes of rearward persons when the light applying means 45 is synchronized with the left-turn indicating lamps (not shown). Since the image of the inside of the vehicle compartment is overlapped with the image of the FIG. 51a on the half mirror 4, the contrast of the image is reduced.

Figure 17:
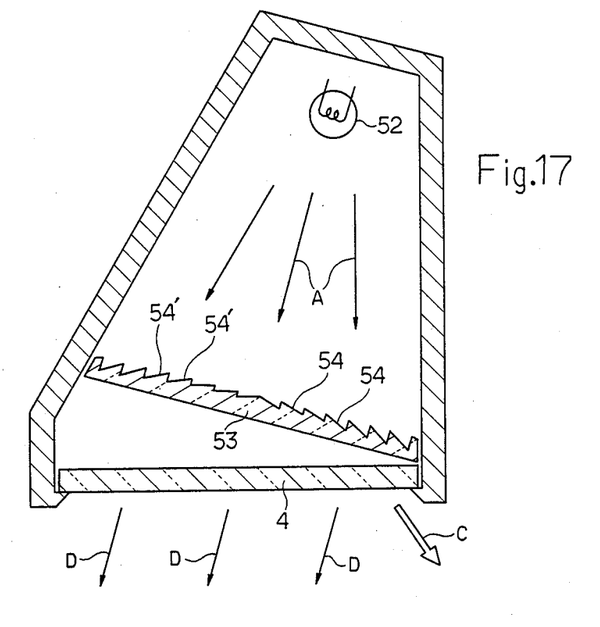
FIG. 17 is a transverse cross section of the sideview mirror assembly of a tenth embodiment.

Tenth Embodiment (See FIG. 17)

A lamp 52 as the light applying means is provided within the mirror housing 41. A light transmitting panel 53 is provided behind the half mirror 4 and inclined. The thickness of the light transmitting panel 53 is gradually increased toward the center from respective right- and left-hand ends so that the light transmitting panel 53 has an arced configuration. Accordingly, the panel 53 serves as a lens. First and second inclined portions 54 and 54' are formed on respective half areas of the arced surface. The first and second inclined portions 45 and 45' are inclined in the same direction as the thickness of the light transmitting panel changes. Black coating is applied to the rise surface of each of the inclined portions 45 and 45' in the same manner as shown in FIG. 13.

When the light applying means 52 is positioned so as to be focused on the light transmitting panel 53, the light is regulated so as to be directed rearwardly, that is, in the direction of arrow D. Consequently, the same effect as in the seventh embodiment is attained in the tenth embodiment.

Figure 18:
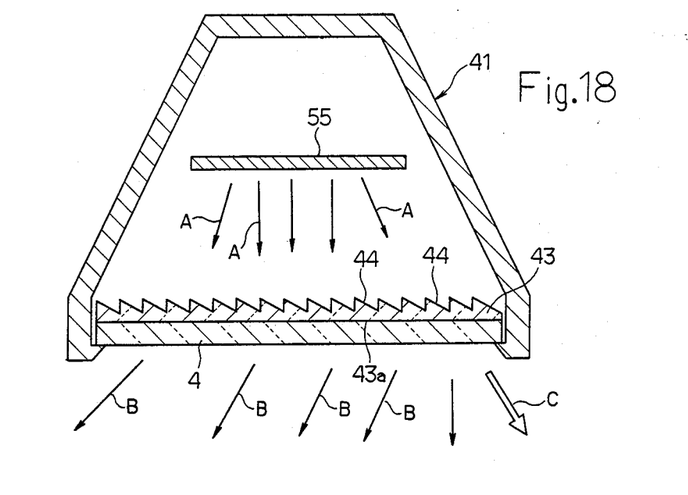
FIG. 18 is a transverse cross section of the sideview mirror assembly of an eleventh embodiment.

Eleventh Embodiment (See FIG. 18)

The sideview mirror of the eleventh embodiment differs from that of the seventh embodiment in that the light applying means 45 is replaced by a light emitting means 55 comprised of an electroluminescent panel or a light-emitting diode. The other component parts are the same as that of the seventh embodiment and the same effect as in the seventh embodiment is attained in the eleventh embodiment.

Figure 19:
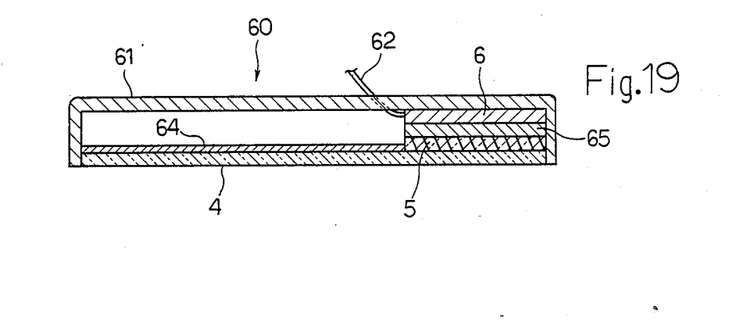
FIG. 19 is a transverse cross section of the rearview mirror assembly of a twelfth embodiment incorporating the sideview mirror assembly of this invention.
Figure 20:
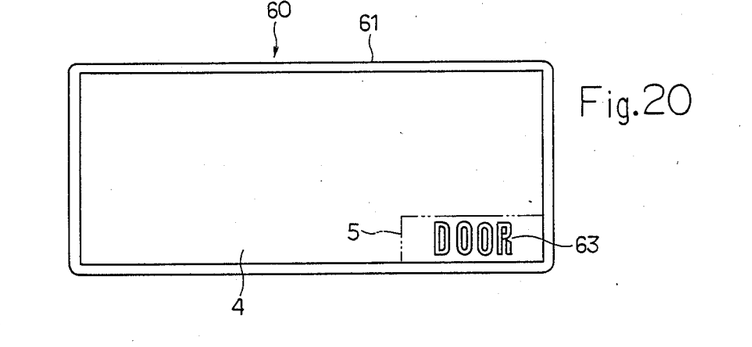
FIG. 20 is a side view of the rearview mirror assembly in FIG. 19.

Twelfth Embodiment (See FIG. 19 and 20)

The sideview mirror assembly of this invention is applied to a rear view mirror mounted for lateral and vertical movement on the central upper inside portion of a front windshield of the automobile. Referring to FIG. 19, a rearview mirror 60 mounted on the front windshield comprises a mirror housing 61 formed of a plastic material having light shielding effect and formed into a flat rectangular enclosure. The half mirror 4 is mounted so as to close a front opening of the mirror housing 61, thereby enabling the driver to view the rearward traffic conditions through the half mirror 4. A rectangular regulating filter 5 is provided in abutment on the right-hand lower corner portion of the backside of the half mirror 4. A light shielding film 64 is applied to the backside of the half mirror 4 except the portion on which the regulating filter 5 abuts. A panel-like light applying means 6 abuts on the backside of the regulating filter 5 which is supplied with electric power through leads 62. A mark plate 65 is provided between the light applying means 6 and the regulating filter 5. The mark plate 65 has a mark 63 such as "DOOR" shown in FIG. 20 and the marked area of the mark plate 65 allows the light to pass therethrough. The light applying means 6 is activated when, for example, the door of the vehicle is closed incompletely. When the light applying means 6 is activated, the mark "DOOR" is lighted and displayed on the half mirror 4.

Since the regulating filter 5 is so arranged that the light from the light applying means 6 reaches the driver through the half mirror 4, the driver can view the displayed mark through the half mirror 4, thereby informing the driver that the door is incompletely closed. Furthermore, the regulating filter 5 prevents the light from the light applying means 6 from being directed to the front windshield. Consequently, the light from the light applying means 6 is not reflected on the front windshield is not narrowed.

Although the regulating filter 5, the light applying means 6 and the mark plate 65 are provided on respective one portions of the backside of the half mirror 4 in the above-described embodiment, all of these members 5, 6 and 65 may be put upon another and integrally mounted in abutment on the whole backside area of the half mirror 4. Furthermore, the mark displayed on the half mirror 4 is not limited to that described above and other marks may be employed.

According to the twelfth embodiment, although the rearview mirror including the light applying means 6 is mounted on the central upper portion of the front windshield, the light from the light applying means 6 is directed only to the driver. Consequently, the light from the light applying means 6 is not reflected on the front windshield and therefore the driver is not prevented by the light from the light applying means 6 from viewing through the front windshield.

The foregoing disclosure and drawings are merely illustrative of the principles of the present invention and are not to be interpreted in a limiting sense. The only limitation is to be determined from the scope of the appended claims.

What is claimed is:

1. A sideview mirror assembly for an automobile the automobile having a forward, driver portion and a rearward portion comprising:
   (a) a half mirror having a back side and being provided on an automobile so that the rearward view from the automobile is reflected thereon, said half mirror having both light reflecting and light transmitting characteristics;
   (b) light irradiating means for introducing sunlight and for irradiating the same toward the back of said half mirror;
   (c) a regulating filter provided on the back side of said half mirror so that light impinging thereon from said light irradiating means passes through said half mirror in the direction toward the rearward portion of the automobile and not in the direction of the driver portion, the regulating filter having a back side; and
   (d) a housing member covering the back side of said mirror and wherein said light irradiating means includes one or more windows formed in said housing member so that sunlight is allowed to pass through the windows of said housing member to the interior of said housing member and to irradiate said half mirror through said regulating filter.

2. A sideview mirror assembly for automobiles as claimed in claim 1, wherein said light irradiating means includes a reflecting member disposed on the back side of said regulating filter for reflecting the sunlight which has passed through said half mirror toward the back side thereof, the sunlight being reflected thereon in the direction opposite to the direction in which the sunlight has passed through said half mirror.

3. A sideview mirror assembly for automobiles of the type having a forward, driver portion and a rearward portion comprising:
   (a) a half mirror provided on an automobile so that the rearward view is reflected thereon, said half mirror having both light reflecting and light transmitting characteristics; the half mirror having a back side;
   (b) a housing member for covering the back side of said half mirror, the housing member defining an interior;
   (c) at least one window formed in said housing member so that sunlight is allowed to pass therethrough to the interior of said housing member so as to be irradiated toward the back side of said half mirror; and
   (d) a regulating filter provided on the back side of said half mirror so that the sunlight impinging thereon through said window passes through said half mirror in the direction of the rearward portion of the automobile and not in the direction of the driver portion.

4. A sideview mirror assembly for automobiles according to claim 3, wherein said regulating filter comprises a transparent panel disposed on the back side of the said half mirror, the transparent panel having a large number of non-transparent films disposed in a spaced-apart relation to one another within the transparent panel.

* * * * *

UNITED STATES PATENT AND TRADEMARK OFFICE
CERTIFICATE OF CORRECTION

PATENT NO. : 4,906,085

DATED : March 6, 1990

INVENTOR(S) : Sugihara et al.

It is certified that error appears in the above-identified patent and that said Letters Patent is hereby corrected as shown below:

Column 9, line 8, after "windshield" insert --so that the view of the driver through the front windshield--.

Claim 1, column 10, line 4, insert --half-- before "mirror".

Signed and Sealed this

Second Day of April, 1991

Attest:

HARRY F. MANBECK, JR.

*Attesting Officer*

*Commissioner of Patents and Trademarks*